(12) United States Patent
Fan et al.

(10) Patent No.: US 7,760,651 B2
(45) Date of Patent: Jul. 20, 2010

(54) SYSTEM AND METHOD FOR DEBUGGING INTERNET PROTOCOL PHONES

(75) Inventors: Huai-Chih Fan, Taipei Hsien (TW); Yew-Min Lo, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 329 days.

(21) Appl. No.: 11/944,421

(22) Filed: Nov. 22, 2007

(65) Prior Publication Data
US 2008/0123538 A1     May 29, 2008

(30) Foreign Application Priority Data
Nov. 24, 2006   (CN) .................. 2006 1 0157056

(51) Int. Cl.
*H04L 12/26* (2006.01)
(52) U.S. Cl. ..................................... 370/241
(58) Field of Classification Search ................. 370/216, 370/241, 242, 310, 328, 351; 709/227–232
See application file for complete search history.

(56) References Cited

U.S. PATENT DOCUMENTS 5,455,947 A * 10/1995 Suzuki et al. ............... 707/204
2007/0168537 A1 * 7/2007 Misra et al. ................. 709/230
2007/0258435 A1 * 11/2007 Saito et al. .................. 370/352
2008/0101341 A1 * 5/2008 Huang ......................... 370/352
2008/0123535 A1 * 5/2008 Saito et al. .................. 370/241

FOREIGN PATENT DOCUMENTS

TW      I227612      2/2005

* cited by examiner

*Primary Examiner*—Dmitry H Levitan
(74) *Attorney, Agent, or Firm*—Frank R. Niranjan

(57) ABSTRACT

A system for debugging an Internet protocol (IP) phone (104) includes an embedded media terminal adapter (EMTA) (100) connected to the IP phone, and a central office device (102) connected to the EMTA via a network. The EMTA includes a data obtaining module (1001) for obtaining operation data of the IP phone, a buffering module (1003) for temporarily storing the operation data, a data determining module (1005) for determining whether the buffering module is, a log file generating module (1007) for accessing the operation data in the buffering module and generating log files, and a storage module (1009) for storing the log files. The central office device is used for calling the log files when there is a malfunction in the IP phone, and restoring normal function to the IP phone via the network.

11 Claims, 5 Drawing Sheets

SYSTEM AND METHOD FOR DEBUGGING INTERNET PROTOCOL PHONES

BACKGROUND OF THE INVENTION

1. Field of the Invention

The invention relates to Internet Protocol (IP) phones, and particularly to a system and a method for debugging an IP phone.

2. Description of Related Art

Usually, an embedded media terminal adapter (EMTA) is connected to a central office device via a network. An IP phone is directly connected to the EMTA. When there is a malfunction in the IP phone, the EMTA outputs debug information to the central office device via serial ports or a telnet connection, but the debug information is not stored in the EMTA. Therefore, if a technician of the central office device wants to get the debug information, he or she must set up an interface connection before the debug transmission occurs.

If the interface connection has not been set up, the technician has no way to retrieve debug information from the EMTA. Thus, the normal function of the phone must be restored in person by the technician.

Therefore, a heretofore unaddressed need exists in the industry to overcome the aforementioned deficiencies and inadequacies.

SUMMARY

An exemplary embodiment of the invention provides a system for debugging an Internet protocol (IP) phone. The system includes an embedded media terminal adapter (EMTA) connected to the IP phone, and a central office device connected to the EMTA via a network. The EMTA includes a data obtaining module for obtaining operation data of the IP phone, a buffering module for temporarily storing the operation data, a data determining module for determining whether the buffering module is full, a log file generating module for accessing the operation data in the buffering module and generating log files, and a storage module for storing the log files. The central office device is used for calling the log files when there is a malfunction in the IP phone and restoring normal function to the IP phone via the network.

Other advantages and novel features will become more apparent from the following detailed description when taken in conjunction with the accompanying drawings, in which:

DETAILED DESCRIPTION OF THE EMBODIMENTS

Figure 1:
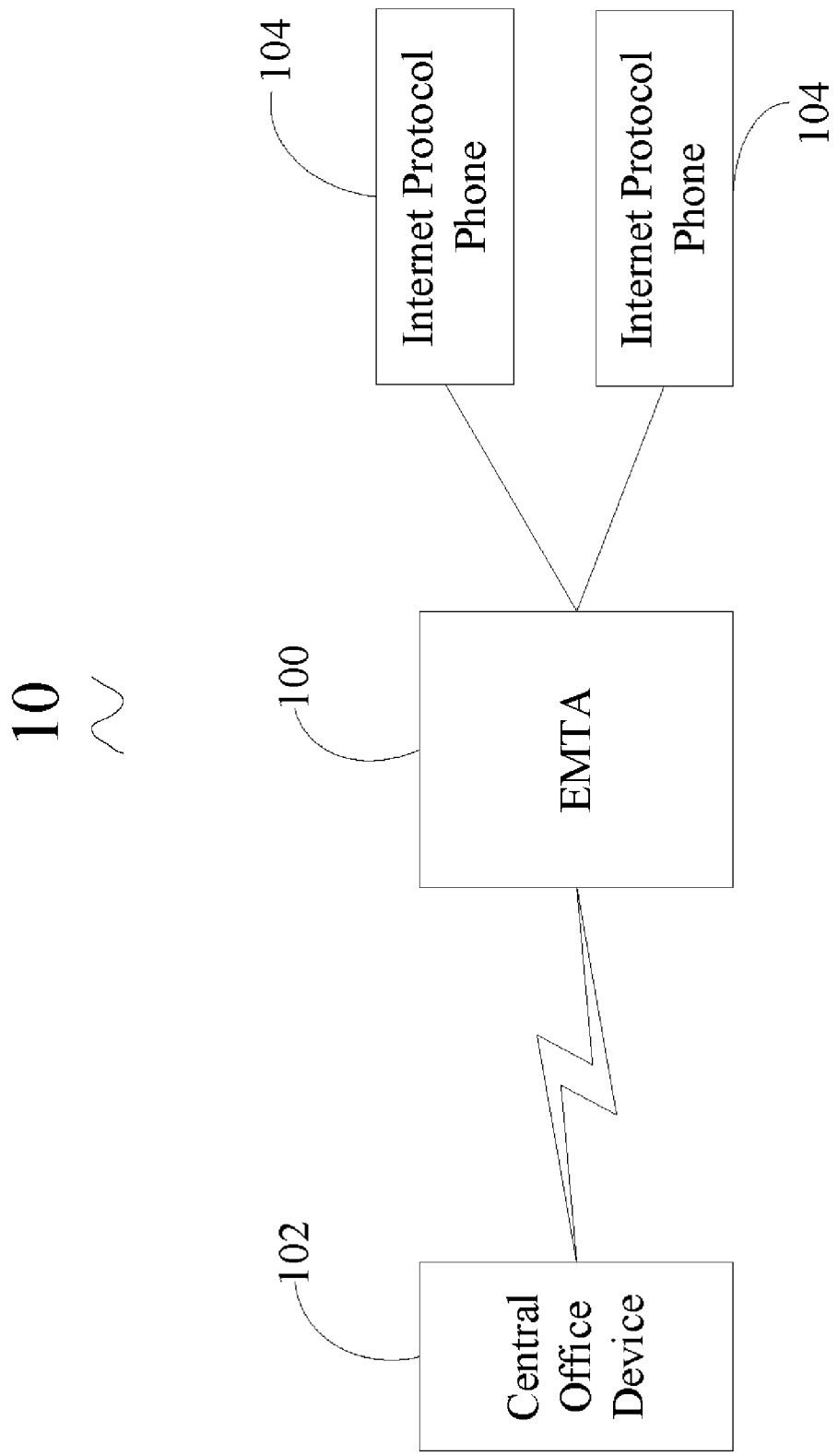
FIG. 1 is a schematic diagram of an Internet Protocol (IP) phone system of an exemplary embodiment, the IP phone system comprising an embedded media terminal adapter (EMTA), a central office device, and an IP phone.

FIG. 1 is a schematic diagram of an Internet Protocol (IP) phone system 10 of an exemplary embodiment. The IP phone system 10 comprises an embedded media terminal adapter (EMTA) 100, an IP phone 104, and a central office device 102. The IP phone 104 is directly connected to the EMTA 100. The EMTA 100 is connected to the central office device 102 via a network.

Figure 2:
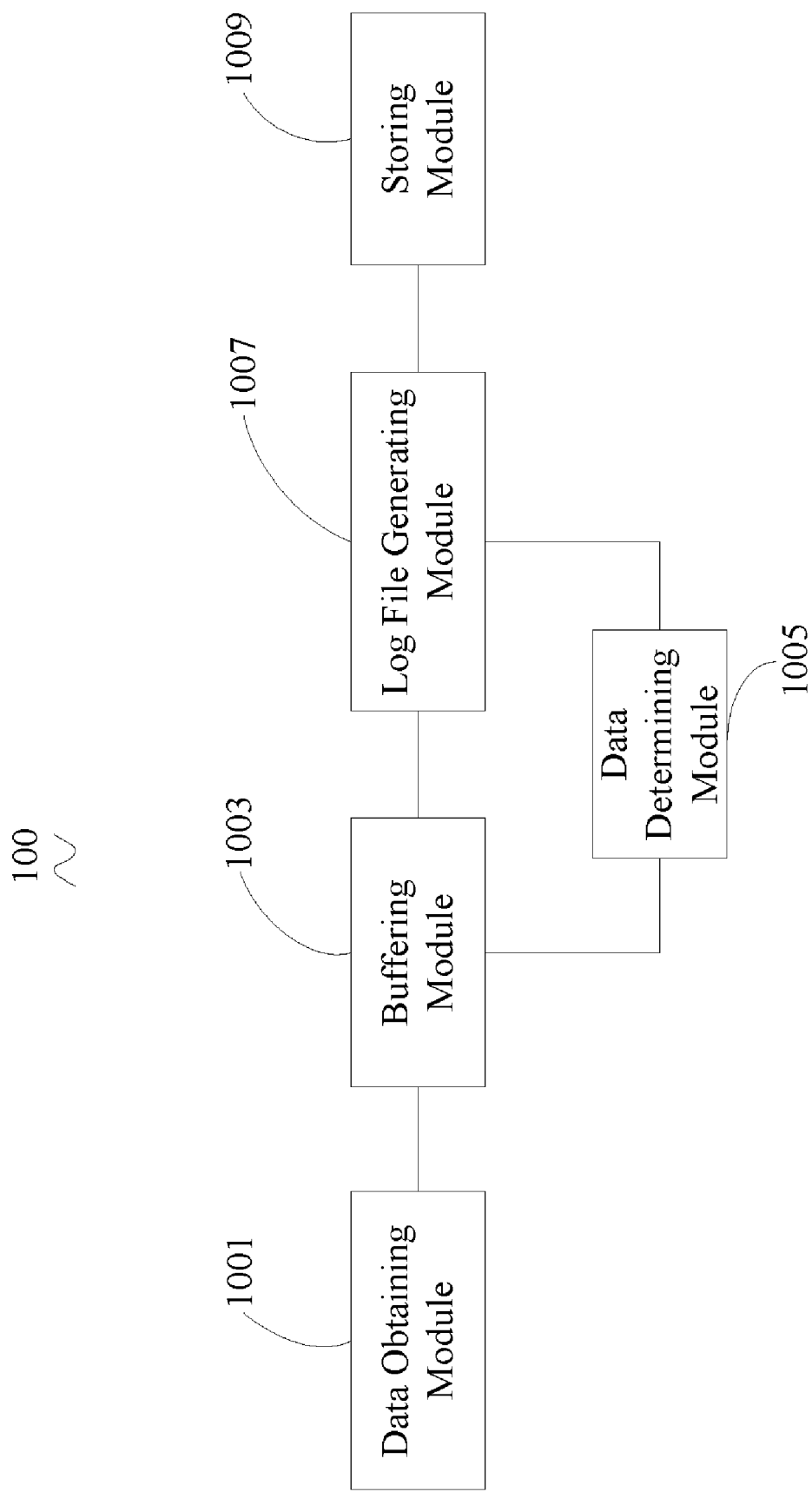
FIG. 2 is a block diagram of the EMTA of the IP phone system of FIG. 1, the EMTA comprising a log file generating module.

FIG. 2 is a block diagram of the EMTA 100 of FIG. 1. The EMTA 100 comprises a data obtaining module 1001, a buffering module 1003, a data determining module 1005, a log file generating module 1007, and a storage module 1009.

The data obtaining module 1001 is used for obtaining operation data of the IP phone 104 and sending the operation data to the buffering module 1003.

The buffering module 1003 is used for temporarily storing the operation data.

The data determining module 1005 determines whether the buffering module 1003 is full. Herein, if the operation data is stored in the buffering module 1003, the operation data is designated as stored operation data. In the exemplary embodiment, the data determining module 1005 compares the size of the stored operation data with the capacity of the buffering module 1003 to determine whether the buffering module 1003 is full. If the size of the stored operation data is equal to the capacity of the buffering module 1003, the buffering module 1003 is full. Correspondingly, if the size of the stored operation data is less than the capacity of the buffering module 1003, the buffering module 1003 is not full.

The log file generating module 1007 accesses the stored operation data from the buffering module 1003 while the stored operation data is full and if there is a malfunction in the IP phone 104, and generates log files to keep the stored operation data. After the stored operation data is accessed, the buffering module 1003 is cleared.

Figure 3:
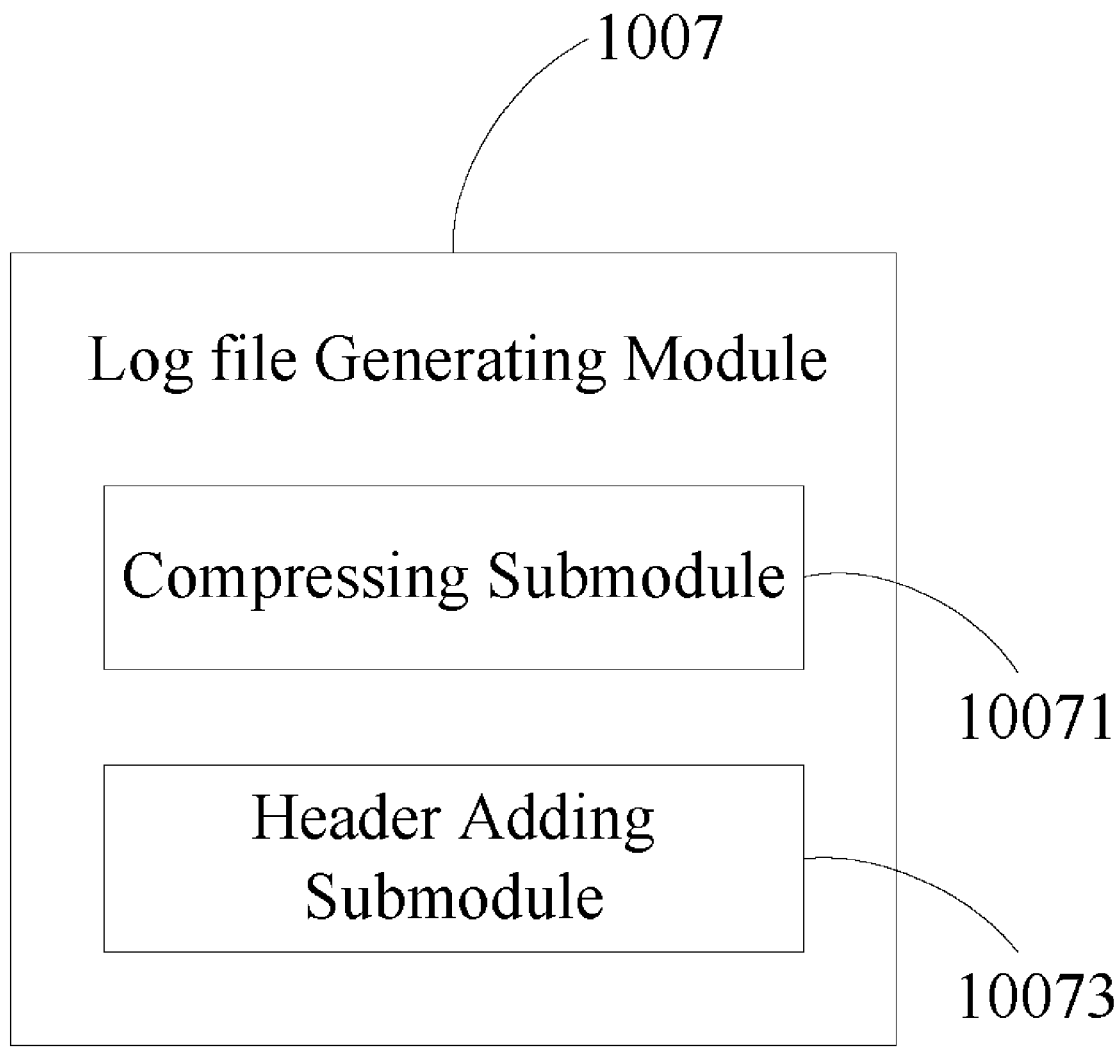
FIG. 3 is a detail block diagram of the log file generating module of the EMTA of FIG. 2.

Referring also to FIG. 3, the log file generating module 1007 comprises a compressing submodule 10071 and a header adding submodule 10073. The compressing submodule 10071 compresses the operation data accessed by the log file generating module 1007, and generates compressed files. The header adding submodule 10073 adds a header to each of the compressed files, and generates the log files. In the exemplary embodiment, the header comprises a sequence code of the log file, a size of the log file, an identifier of the log file, a checksum value of the length of the log file, method of compressing the log file, and so on.

The storage module 1009 is used for storing the log files. In the exemplary embodiment, the capacity of the storage module 1009 is limited. If the storage module 1009 is full when a new log file is created, the new log file will replace the oldest log file stored therein. In the exemplary embodiment, the capacity of the storage module 1009 is 384000 bytes. The size of the log file is 128 bytes. That is, 3000 log files can be stored simultaneously in the storage module 1009.

Figure 4:
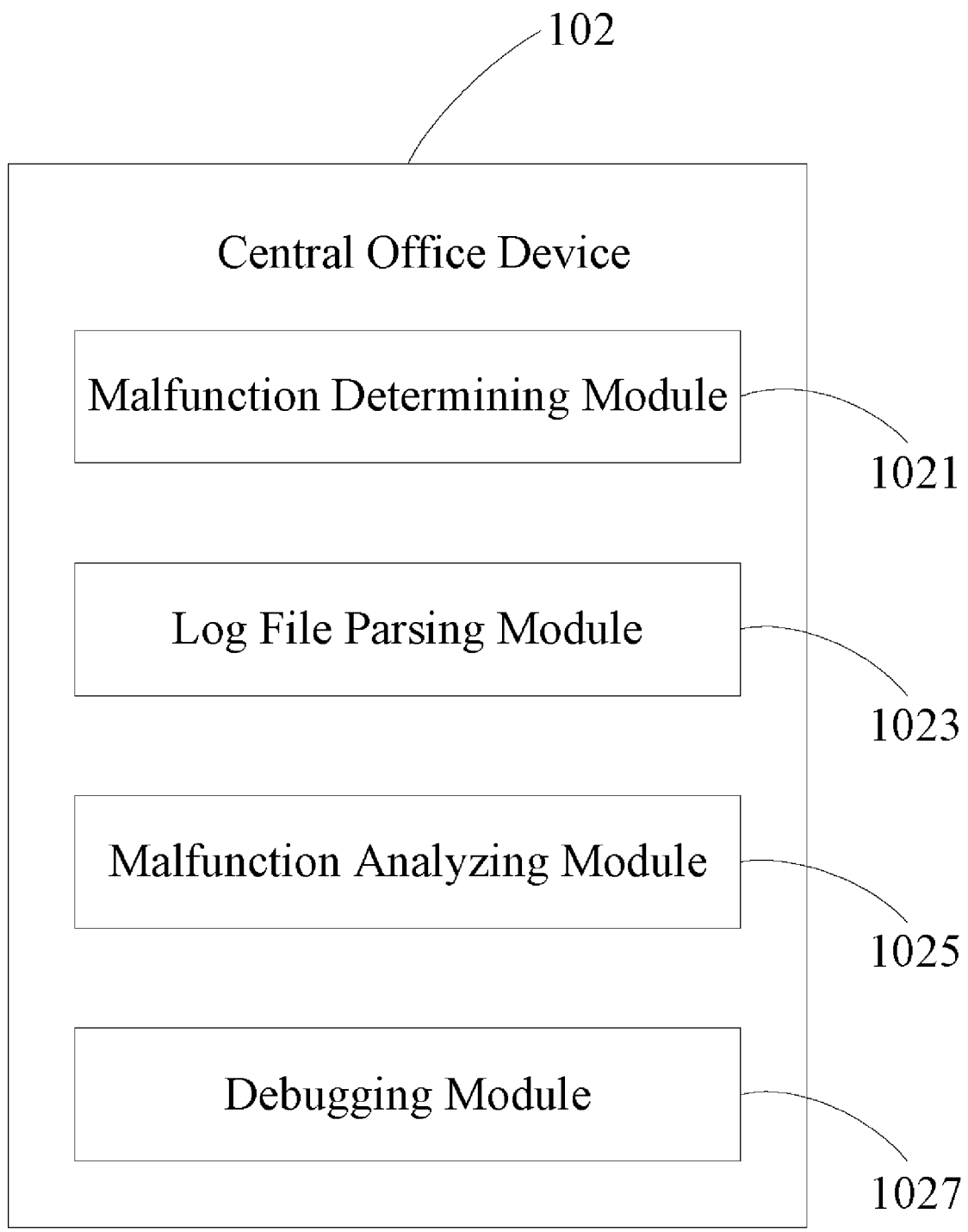
FIG. 4 is a block diagram of the central office device of the IP phone system of FIG. 1.

FIG. 4 is a block diagram of the central office device 102 of FIG. 1. The central office device 102 comprises a malfunction determining module 1021, a log file parsing module 1023, a malfunction analyzing module 1025, and a debugging module 1027.

The malfunction determining module 1021 is used for determining whether there is a malfunction in the IP phone 104.

The log file parsing module 1023 is used for calling the log files in the storage module 1009, and decompressing the log files to obtain the operation data via the network.

The malfunction analyzing module 1025 is used for analyzing the operation data from the log file parsing module 1023 to determine nature and cause of the malfunction.

The debugging module 1027 is used for restoring normal function to the IP phone 104 in light of the nature and cause of the malfunction via the network. Therefore, a technician of the central office device 102 can restore normal function to the IP phone 104 via calling the operation data stored in the EMTA 100 even if there is not an interface connection before the malfunction occurs.

Figure 5:
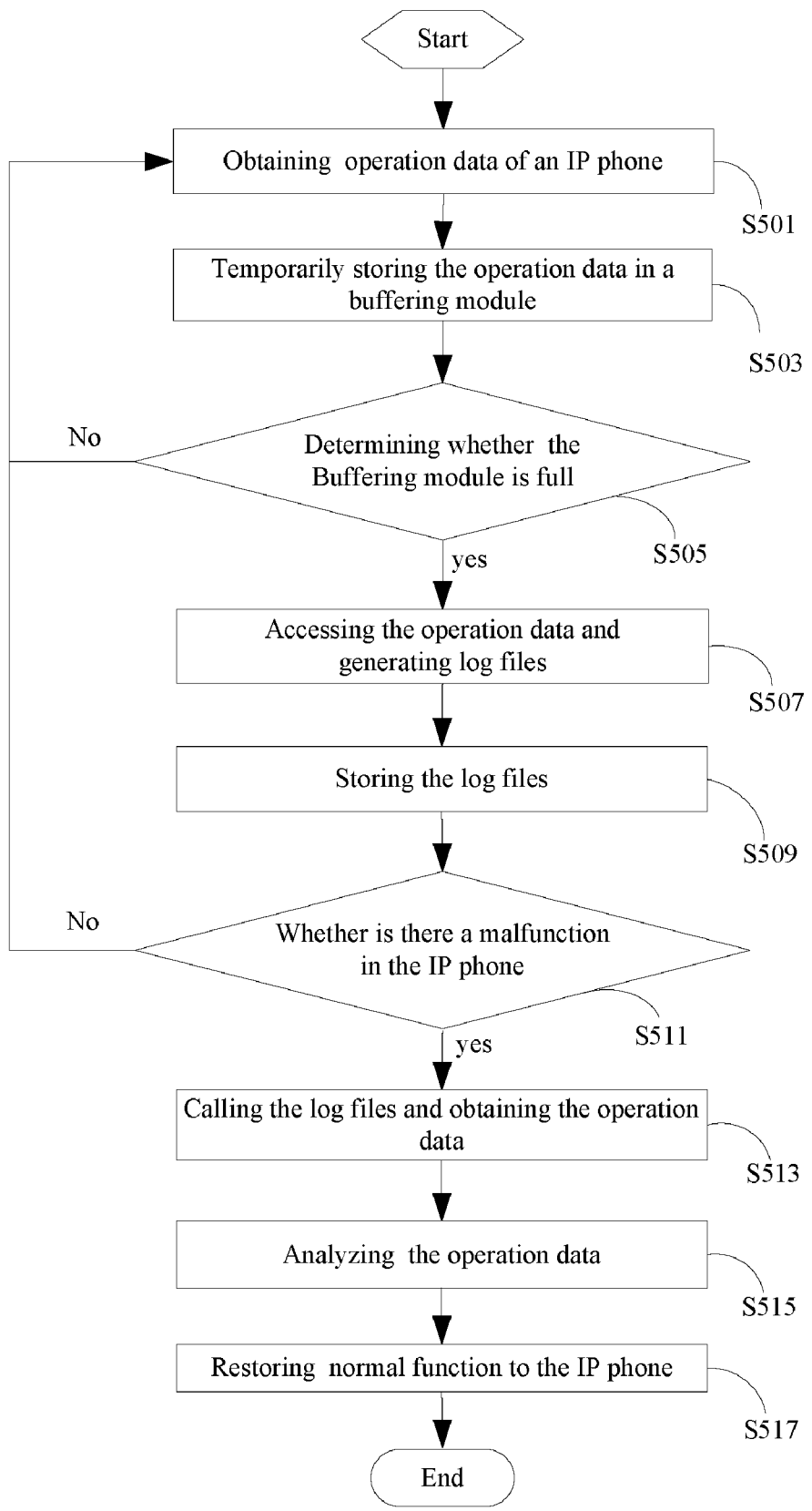
FIG. 5 is a flowchart of a method for debugging the IP phone.

FIG. 5 is a flowchart of a method for debugging the IP phone 104 of an exemplary embodiment of the invention.

In step S501, the data obtaining module 1001 obtains the operation data of the IP phone 104.

In step S503, the buffering module 1003 temporarily stores the operation data from the data obtaining module 1001.

In step S505, the data determining module 1005 determines whether the buffering module 1003 is full. Herein, if the operation data of the IP phone 104 is stored in the buffering module 1003, the operation data of the IP phone 104 is designated as stored operation data. In the exemplary embodiment, the data determining module 1005 compares the size of the stored operation data with the capacity of the buffering module 1003 to determine whether the buffering module 1003 is full. If the size of the stored operation data is equal to the capacity of the buffering module 1003, the buffering module 1003 is full. Correspondingly, if the size of the stored operation data is less than the capacity of the buffering module 1003, the buffering module 1003 is not full. If the buffering module 1003 is full, the process proceeds to step S507. Conversely, if the buffering module 1003 is not full, the process proceeds to step S501.

In step S507, the log file generating module 1007 accesses the stored operation data from the buffering module 1003, and generates log files. In the exemplary embodiment, the compressing submodule 10071 compresses the operation data accessed by the log file generating module 1007, and generates compressed files. The header adding submodule 10073 adds a header to each of the compressed files, and generates the log files. In the exemplary embodiment, the header comprises a sequence code of the log file, a size of the log file, an identifier of the log file, a checksum value of the length of the log file, method of compressing the log file, and so on.

In step S509, the storage module 1009 stores the log files. In the exemplary embodiment, the capacity of the storage module 1009 is limited. If the storage module 1009 is full when a new log file is created, the new log file will replace the oldest log file stored therein.

In step S511, the malfunction determining module 1021 of the central office device 102 determines whether there is a malfunction in the IP phone 104. If there is a malfunction in the IP phone 104, the process proceeds to step S513. Conversely, if there is not a malfunction in the IP phone 104, the process proceeds to step S501.

In step S513, the log file parsing module 1023 calls the log files stored in the storage module 1009, and decompresses the log files to obtain the operation data of the IP phone 104, via the network.

In step S515, the malfunction analyzing module 1025 analyzes the operation data from the log file parsing module 1023 to determine nature and cause of the malfunction.

In step S517, the debugging module 1027 restores normal function to the IP phone 104 according to the findings of step 515.

Because the operation data of the IP phone 104 is stored in the EMTA 100, operation data of the IP phone 104 can be obtained regarding a malfunction of the IP phone 104 even after the event has already occurred, thus allowing remote restoration of normal function to the IP phone 104 via the network.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. An embedded media terminal adapter (EMTA) connected to an Internet protocol (IP) phone, comprising:
    a data obtaining module for obtaining operation data of the IP phone;
    a buffering module for temporarily storing the operation data;
    a data determining module for determining whether the buffering module is full;
    a log file generating module for accessing the operation data stored in the buffering module when the buffering module is full, and generating log files to keep the operation data stored in the buffering module; and
    a storage module for storing the log files.

2. The EMTA as claimed in claim 1, wherein the log file generating module comprising:
    a compressing submodule for compressing the operation data accessed by the log file generating module, and generating a compressed file; and
    a header adding submodule for adding a header to each of the compressed files, and generating the log files.

3. The EMTA as claimed in claim 2, wherein the header comprises a sequence code of the log file, a size of the log file, an identifier of the log file, a checksum value of length of the log file, and method of compressing the log file.

4. A system for debugging an Internet protocol (IP) phone comprising:
    an embedded media terminal adapter (EMTA) connected to the IP phone, the EMTA comprising:
        a data obtaining module for obtaining operation data of the IP phone;
        a buffering module for temporarily storing the operation data;
        a data determining module for determining whether the buffering module is full;
        a log file generating module for accessing the operation data stored in the buffering module when the buffering module is full, and generating log files to keep the operation data in the buffering module; and
        a storage module for storing the log files; and
    a central office device connected to the EMTA via a network, the central office device for calling the log files when there is a malfunction in the IP phone and restoring normal function to the IP phone via the network.

5. The system as claimed in claim 4, wherein the log file generating module comprising:
    a compressing submodule for compressing the operation data accessed by the log file generating module, and generating a compressed file; and
    a header adding submodule for adding a header to each of the compressed files, and generating the log files.

6. The system as claimed in claim 4, wherein the header comprises a sequence code of the log file, a size of the log file, an identifier of the log file, a checksum value of length of the log file, and a method of compressing the log file.

7. The system as claimed in claim 4, wherein the central office device comprising:
    a malfunction determining module for determining whether there is a malfunction in the IP phone;
    a log file parsing module for calling the log files stored in the storage module, and decompressing the log files to obtain the operation data;

a malfunction analyzing module analyzing the operation data from the log file parsing module to determine nature and cause of the malfunction; and a debugging module restoring normal function to the IP phone, in light of the nature and cause of the malfunction, via the network.

8. A method for debugging an Internet protocol (IP) phone, the method comprising:
obtaining operation data of the IP phone;
storing the operation data in a buffering module;
determining whether the buffering module is full;
accessing the operation data stored in the buffering module when the buffering module is full and generating log files to keep the operation data stored in the buffering module;
storing the log files;
determining whether there is a malfunction in the IP phone;
calling the log files if there is a malfunction in the IP phone and obtaining the operation data; and restoring normal function to the IP phone in light of the operation data.

9. The method as claimed in claim 8, wherein the step of accessing the operation data stored in the buffering module and generating log files further comprising:
compressing the accessed operation data and generating compressed files; and
adding a header to each of the compressed files and generating the log files.

10. The method as claimed in claim 9, wherein the header comprises a sequence code of the log file, a size of the log file, an identifier of the log file, a checksum value of length of the log file, and a method of compressing the log file.

11. The method as claimed in claim 9, further comprising:
decompressing the log files to obtain the operation data;
analyzing the operation data and obtaining nature and cause of the malfunction; and
restoring normal function to the IP phone in light of the nature and cause of the malfunction.

* * * * *